(12) United States Patent
Rist et al.

(10) Patent No.: US 7,751,544 B2
(45) Date of Patent: Jul. 6, 2010

(54) METHOD AND SYSTEM FOR DRIVING AN INDICATING ELEMENT ON A TERMINAL

(75) Inventors: Claus Rist, Bochum (DE); Roland Roth, Gelsenkirchen (DE); Michael Willmann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 1477 days.

(21) Appl. No.: 10/268,088

(22) Filed: Oct. 10, 2002

(65) Prior Publication Data

US 2003/0154245 A1 Aug. 14, 2003

(30) Foreign Application Priority Data

Oct. 10, 2001 (DE) .............................. 101 49 983

(51) Int. Cl.
*H04M 3/42* (2006.01)
*H04M 3/00* (2006.01)
*H04M 5/00* (2006.01)

(52) U.S. Cl. .......................... 379/211.01; 379/211.02; 379/212.01; 379/214.01; 379/265.01; 379/274; 455/414.1; 455/417

(58) Field of Classification Search ............ 379/211.01, 379/157, 229, 297, 214.01, 265.01, 32.03, 379/201.01, 211.02, 212.01, 273, 274, 201.1, 379/395.01; 709/230; 370/395.1, 260, 378; 455/436, 414.1, 417, 445
See application file for complete search history.

(56) References Cited

U.S. PATENT DOCUMENTS

| | | | | |
|---|---|---|---|---|
| 4,510,351 A | * | 4/1985 | Costello et al. | 379/265.01 |
| 4,644,528 A | * | 2/1987 | Ahmad et al. | 370/378 |
| 4,790,004 A | * | 12/1988 | Nalbone | 379/214.01 |
| 4,850,011 A | * | 7/1989 | Delmege et al. | 379/157 |
| 5,608,779 A | * | 3/1997 | Lev et al. | 455/436 |
| 5,799,076 A | * | 8/1998 | Sitters et al. | 379/229 |
| 5,937,035 A | * | 8/1999 | Andruska et al. | 379/32.03 |
| 6,052,461 A | * | 4/2000 | Lam | 379/297 |
| 6,731,609 B1 | * | 5/2004 | Hirni et al. | 370/260 |
| 6,795,437 B1 | * | 9/2004 | Rasanen et al. | 370/395.1 |
| 6,950,876 B2 | * | 9/2005 | Bright et al. | 709/230 |

FOREIGN PATENT DOCUMENTS

| DE | 100 16 244 A1 | 10/2001 |
|---|---|---|
| EP | 0 982 919 A2 | 3/2000 |

(Continued)

OTHER PUBLICATIONS

Standard ECMA-285, $2^{nd}$ Edition, Protocol for Computer Supported Telecommunications Applications (CSTA) Phase III, Jun. 2000, pp. 1-426.

(Continued)

*Primary Examiner*—Thjuan K Addy
(74) *Attorney, Agent, or Firm*—Staas & Halsey LLP

(57) ABSTRACT

A terminal operated at a switching facility has at least one indicating element which indicates operating modes of another terminal allocated to the indicating element. The other terminal is operated at another switching facility. Calls to the other terminal may be picked up by operating a function element, e.g., pressing a key, associated with the indicating element that indicates the operating modes of the other terminal, when an incoming call to the other terminal is indicated.

14 Claims, 8 Drawing Sheets

FOREIGN PATENT DOCUMENTS

WO     WO 96/27266     9/1996

OTHER PUBLICATIONS

"Standard ECMA-269, 5th Edition, Services for Computer Supported Telecommunications Applications (CSTA) Phase III", Dec. 2002, pp. 1-688, including "Standard ECMA-269, 4th Edition, Services for Computer Supported Telecommunications Applications (CSTA) Phase III", Jun. 2000.

German Examination Report for Application No. 101 49 983.3-42; dated Apr. 10, 2006.

* cited by examiner

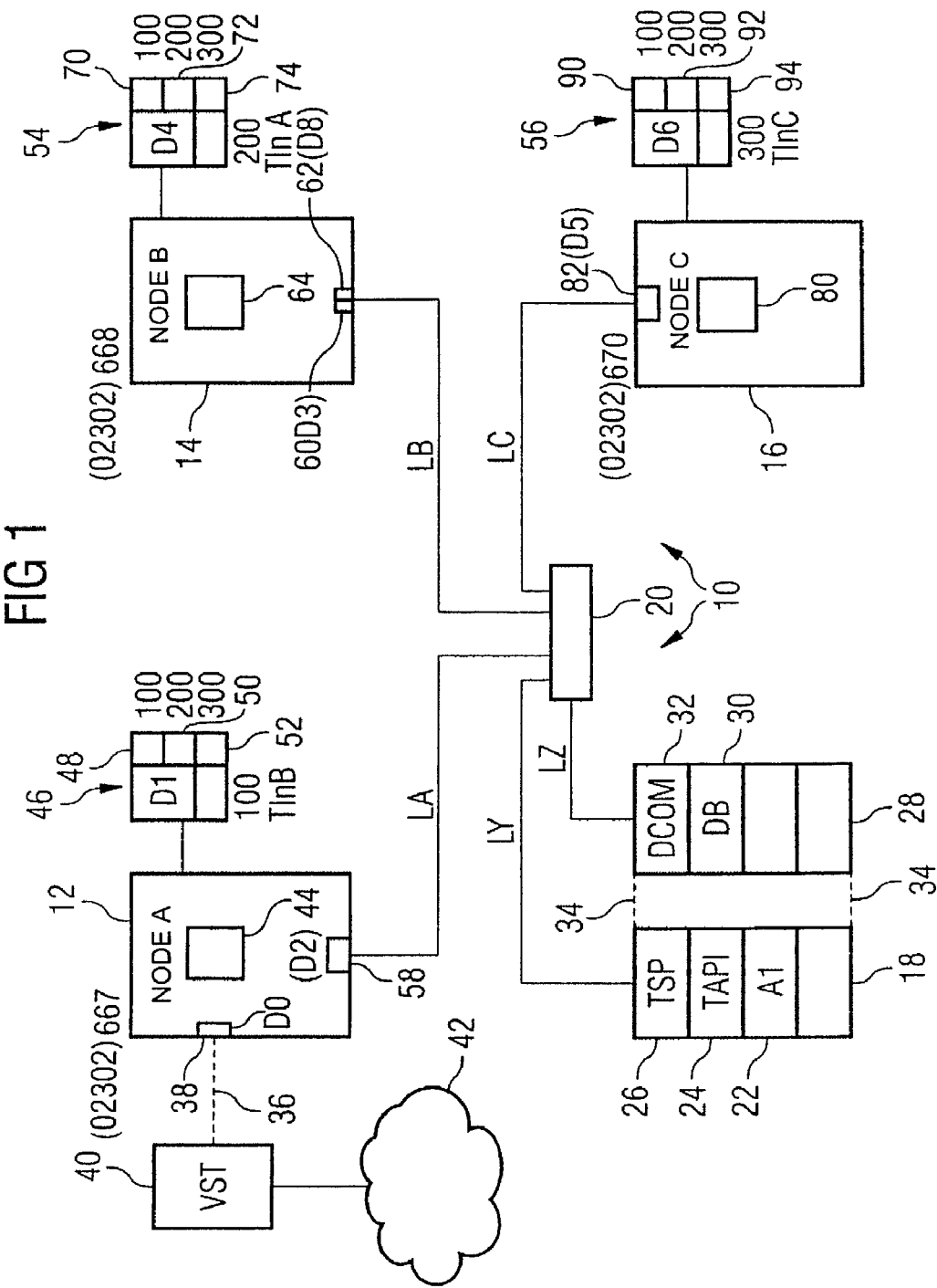

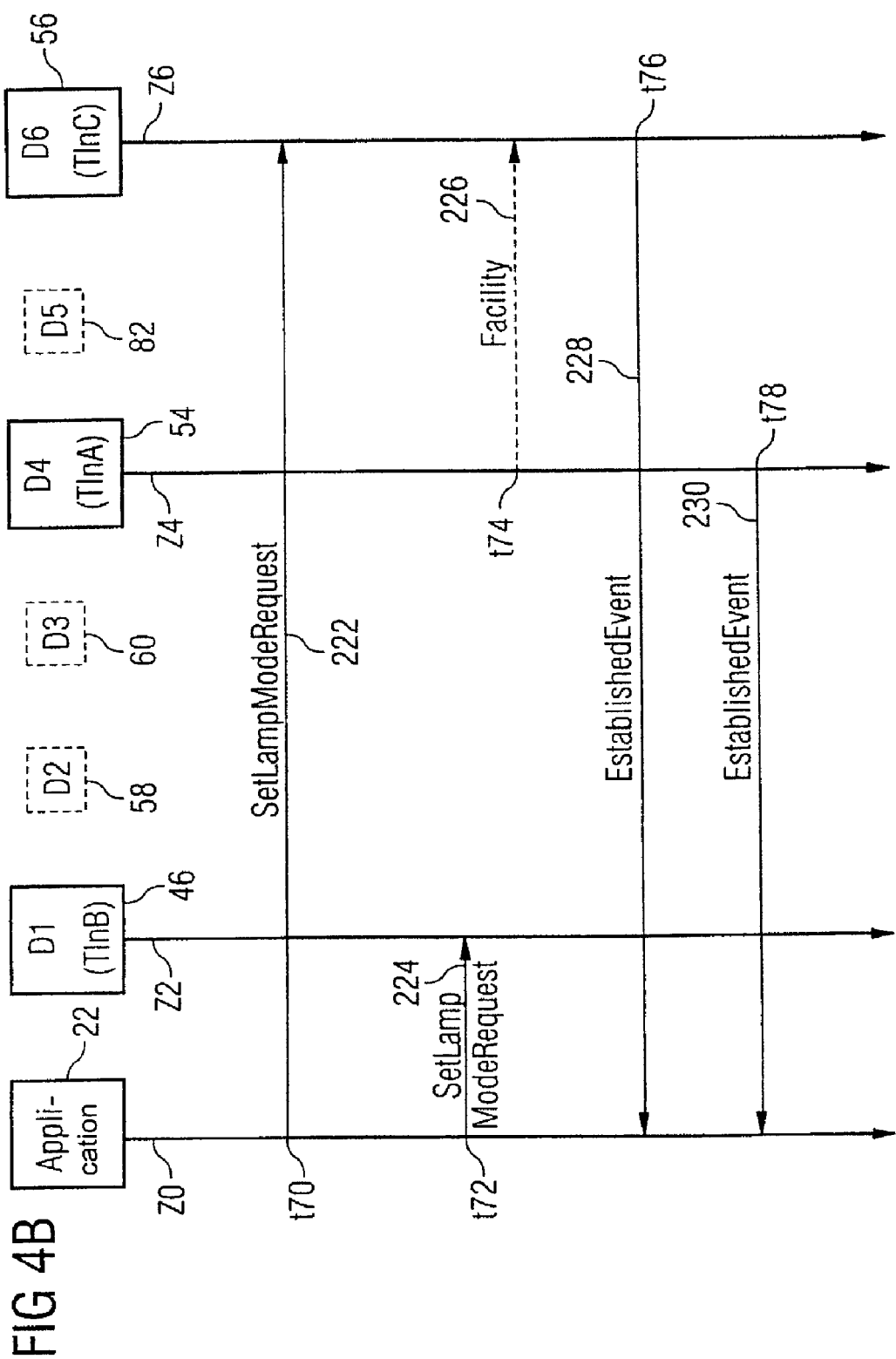

FIG 6

| | 7 | 6 | 5 | 4 | 3 | 2 | 1 | 0 | | |
|---|---|---|---|---|---|---|---|---|---|---|
| Elementname (0xB0) | 1 | 0 | 1 | 1 | 0 | 0 | 0 | 0 | ~252 | ⎫ 270 |
| Element length (8) | 0 | 0 | 0 | 0 | 1 | 0 | 0 | 0 | ~254 | ⎭ |
| Identifier (4) | 0 | 0 | 0 | 0 | 0 | 1 | 0 | 0 | ~256 | ⎫ |
| LED-Mode (2) | 0 | 0 | 0 | 0 | 0 | 0 | 1 | 0 | ~258 | 272 |
| Device (4) | 0 | 0 | 0 | 0 | 0 | 1 | 0 | 0 | ~260 | ⎭ |
| Identifier (6) | 0 | 0 | 0 | 0 | 0 | 1 | 1 | 0 | ~262 | ⎫ |
| LED-Mode (3) | 0 | 0 | 0 | 0 | 0 | 0 | 1 | 1 | ~264 | 274 |
| Device (4) | 0 | 0 | 0 | 0 | 0 | 1 | 0 | 0 | ~266 | ⎭ |

250

METHOD AND SYSTEM FOR DRIVING AN INDICATING ELEMENT ON A TERMINAL

CROSS REFERENCE TO RELATED APPLICATIONS

This application is based on and hereby claims priority to German Application No. 101 49 983.3 filed on Oct. 10, 2001, the contents of which are hereby incorporated by reference.

BACKGROUND OF THE INVENTION

The invention relates to, among other things, a method in which a terminal is operated on a switching facility. The terminal carries at least one indicating element which indicates operating modes of a terminal associated with the indicating element. The indicating element is driven by the switching facility with the aid of signaling messages in dependence on the operating modes of the terminal associated with the indicating element.

The indicating element is, for example, a lamp or a light-emitting diode (LED). However, the indicating element can also be a particular area on a screen or on a liquid crystal display (LCD).

The switching facility may be, for example, a telecommunication system or a so-called communication server. A communication server is a switching facility on a personal computer which is connected to a gateway via a local data transmission network, e.g. via a LAN, and forms a telecommunication system in this constellation. Apart from the voice transmission functions, this platform provides the possibility of multimedia communication. A personal computer is understood to be a data processing system which is originally provided for a single user.

The terminal may be, for example, a telephone which is connected to the switching facility via a line. However, the functions of the terminal can also be produced by a computer, e.g. by a personal computer.

A method as described above may be executed, for example, during the operation of the telecommunication system of the HICOM type which is produced by SIEMENS AG. However, this method is also executed by using a communication server, i.e. by using a telecommunication system based on a personal computer. It is possible to associate the indicating element either with a terminal which is connected to the same switching facility as the terminal carrying the indicating element. As an alternative, however, the indicating element can also be associated with a so-called external terminal, i.e. a terminal which is not connected to the same switching facility. However, the indicating element is only driven when the terminal associated with the indicating element is connected to the same switching facility, i.e. the same telecommunication system.

In the immediate vicinity of the indicating element, for example next to the indicating element, there is a function key via which the terminal associated with the indicating element can be reached. It is thus possible to perform so-called abbreviated dialing via the function key to external terminals or to terminals which are connected to the same switching facility.

In addition, there is a "pick-up" feature for terminals which are connected to the same switching system. With this feature, the two terminals are located, for example, in the same room or in immediate hearing range with respect to the ringing tone generated by the terminals. If the terminal associated with the indicating element is called, the incoming call can be picked up at the terminal which carries the function key and the indicating element by operating the function key associated with the indicating element.

The features "associating indicating elements and function keys with terminals" and "call pick-up" are intensively used by many subscribers and thus have high acceptance.

SUMMARY OF THE INVENTION

Nevertheless, an object of the invention is to specify an improved method for driving an indicating element at a terminal. In addition, an associated switching facility, an associated system link-up and an associated program are to be specified.

In a method according to the invention, the terminal associated with the indicating element is operated at another switching unit. At least one operating mode message which signals the operating mode of the terminal associated with the indicating element is sent to the switching facility for operating the terminal with the indicating element. The switching facility for operating the terminal with the indicating element drives the indicating element in dependence on the operating mode message.

Using an operating mode message for signaling the operating mode of a terminal in an overlapping manner over various switching facilities is a simple option for eliminating a restriction which has hitherto been accepted, and thus for considerably improving the operating convenience.

In a development of the method according to the invention, a function element is arranged in a close spatial relationship with the indicating element, and this function element can be operated so that the terminal associated with the indicating element can be reached. The function element is, for example, a key or a button shown on a screen. In the development, an operating mode in which the terminal associated with the indicating element is called from a third terminal is indicated on the indicating element. For example, the indicating element flashes to indicate the operating mode "called". When the function key is operated in conjunction with this operating mode being displayed, i.e. either simultaneously with the display or immediately thereafter, operations for picking up the call are performed. Picking up the call means that the calling terminal is connected to the terminal which carries the indicating element.

The development also considerably extends the range of application of the "call pick-up" feature because it is now also possible to pick up a call in an overlapping manner over various switching facilities.

In a next development, the operation of picking up the call includes a call diversion of the incoming call from the terminal originally called to the terminal with the indicating element. This development makes it possible to pick up the call by utilizing a function which, in any case, is frequently already available. If necessary, only comparatively small changes need to be made to the method for call diversion previously used.

In another development of the method according to the invention, the operating mode message signals the operating mode of the terminal associated with the indicating element directly. As an alternative, however, the operating mode of the terminal associated with the indicating element is signaled indirectly by specifying an operating mode for the indicating element. This measure makes it possible to use the information about the operating mode directly for driving the indicating element.

In a next development of the method according to the invention, the operating mode message is a message according to the CSTA protocol or, respectively, according to a protocol based on the CSTA protocol. The CSTA protocol was specified by the European Computer Manufacturers' Association (ECMA) in Standard 269, "Services for Computer Supported Telecommunications Applications (CSTA) Phase III", see, for example, the third edition of December 1998 or the fourth edition of June 2000, respectively. The CSTA standard makes it possible to link switching systems of different manufacturers in one system link-up.

In an alternative development of the method according to the invention, the operating mode message signals a number of operating modes for different terminals. This measure makes it possible to considerably reduce the number of operating mode messages to be transmitted.

In another development of the method according to the invention, a number of switching systems are connected via a data packet transmission network. The data packet transmission network is, for example, the Internet or a network operating in accordance with the Internet protocol. However, Ethernet networks are also used. Whereas data packets are transmitted connectionlessly in lower protocol layers in a data packet transmission network, connections are also set up on lower protocol layers in a circuit-switch data transmission network, for example time slots are interconnected. However, tunneling protocols make it possible to connect the two types of transmission to one another.

In a development of the method according to the invention, a central control unit is used to which, on the one hand, the operation of function keys at the terminals is signaled and which, on the other hand, generates the operating mode messages. Due to the central control unit, the individual switching systems can be configured in a simple manner, for example with comparatively little memory required and with comparatively little processor power.

The central control units generates the operating mode messages by using a call model, for example by using the call models provided in the CSTA standard. Using a call model is a simple way of noting changes in operating modes and responding to such changes.

The invention also relates to a switching facility, particularly a telecommunication system or a communication server which produces the function of a telecommunication system, the switching facility being configured in such a manner that, when it is operated, the method according to the invention or a development thereof is executed. Furthermore, the invention relates to a system link-up which contains at least two switching facilities during the operation of which the method according to the invention or a development thereof is executed. In addition, a program is invented which contains an instruction sequence during the execution of which by a processor the method according to the invention or a development thereof is executed. Accordingly, the abovementioned technical effects also apply to the switching facility, to the system link-up and to the program.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 is a block diagram of a link-up of telecommunication systems,

FIGS. 4A and 4B are timing diagrams messages generated during a call transfer performed within the link-up, FIG. 6 is a table illustrating an information element having a number of element entries.

DETAILED DESCRIPTION OF THE PREFERRED EMBODIMENT

Figure 2A:
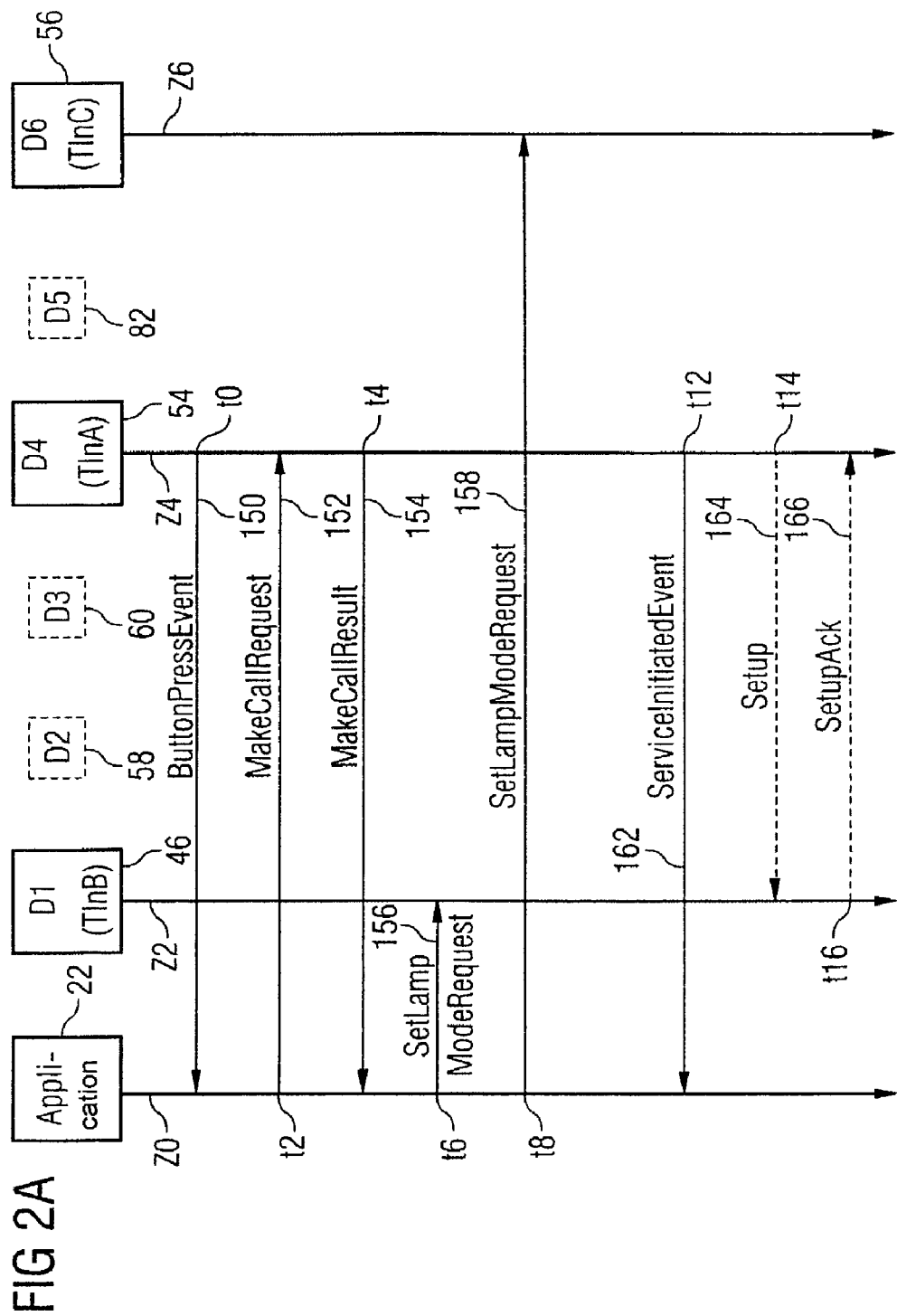
FIGS. 2A and 2B are timing diagrams of messages generated during a call performed within the link-up.

Reference will now be made in detail to the preferred embodiments of the present invention, examples of which are illustrated in the accompanying drawings, wherein like reference numerals refer to like elements throughout.

FIG. 1 shows a telecommunication system link-up 10 which contains three telecommunication systems 12, 14 and 16, also referred to as switching centers or facilities. If, for example, the telecommunication systems 12, 14 and 16 are located in Witten, Germany, they could be reached by dialing 02302. The telecommunication systems 12, 14 and 16 have, for example, system call numbers 667, 668 and 670, respectively.

The telecommunication systems 12 to 16 are connected to a computer 18 via a local data transmission network 20, for example via an Ethernet or a data transmission network transmitting in accordance with the Internet protocol. The telecommunication systems 12 to 16 are, for example, telecommunication systems of the HICOM 150E type by SIEMENS AG. In comparison with known telecommunication systems, however, the telecommunication systems 12 to 16 have been extended by functions which make it possible to signal call modes of telephones within the link-up 10 without restrictions and, as a result, in particular provide for the unrestricted utilization of the "call transfer" feature.

The computer 18 is, for example, a personal computer which contains a memory unit and a processor. In the memory unit, an application program 22 is stored which produces functions for the unrestricted signaling of call modes within the link-up 10. The functions of the application program 22 will become clear below by the explanations for FIGS. 2A to 6.

In addition, the memory unit of the computer 18 contains a Telecommunication Application Programming Interface (TAPI) 24 which was programmed by MICROSOFT GmbH. Furthermore, the memory unit of the computer 18 contains a TSP (TAPI service provider) program 26 which is offered, for example, with the telecommunication systems 12 to 16, e.g. under the product name 3rd-party TSP in the case of HICOM systems. The TSP program 26 provides for CSTA connections between the telecommunication systems 12, 14 and 16, on the one hand, and the computer 18, on the other hand. The TSP program 26 also converts CSTA commands into TAPI commands for the TAPI interface 24. On the other hand, TAPI commands coming from the TAPI interface 24 are also converted into CSTA commands. Other functions of the TSP program 26 will become clear in the explanation of FIGS. 2A to 6.

The data transmission network 20 is also connected to a database computer 28, the memory of which contains a database 30. The database contains, among other things, information on the allocation of function keys at the telephones of the link-up 10 to short code destinations at which other telephones of the link-up can be reached. The application program 22 and the TSP program 26 access the database 30 by using a so-called DCOM interface 32 which has also been developed by MICROSOFT GmbH. In another exemplary embodiment, however, the database 30 is located in the memory unit of the computer 18, see dashed line 34, so that the DCOM interface is not required in this case.

In data transmission network 20, telecommunication systems 12, 14 and 16 can be reached at addresses LA, LB and LC, respectively, in this order. The computer 18 and data-base computer 28 can be reached at addresses LY and LZ, respectively. In addition to the addresses LA to LZ, there are also so-called port numbers which identify a particular connection.

The telecommunication system 12 is connected via a subscriber line 36 and a line unit 38 to a switching center (VST) 40 of a public telephone network 42, e.g. to the circuit-switched telephone network of Deutsche Telekom AG. The switching center 40 is, for example, a switching center of the digital electronic switching system (EWSD) type by SIEMENS AG.

The telecommunication system 12 also contains a control unit 44 which produces the switching function. In addition, the control unit 44 also handles functions for signaling call modes which will become clear below by the explanations for FIGS. 2A to 6.

The telecommunication system 12 is connected to a multiplicity of telephones, one telephone 46 of which is shown in FIG. 1. The telephone 46 can be reached by the internal call number "100". The telephone 46 has a multiplicity of function keys, of which three function keys 48, 50 and 52 are shown in FIG. 1. Function key 48 is allocated to the internal call number "100", i.e. the telephone 46 itself. Function key 50 is allocated to a call number "200" within the link-up, by which a telephone 54 connected to the telecommunication system 14 can be reached. Function key 52 is associated with the call number "300" within the link-up, by which a telephone 56 connected to the telecommunication system 16 can be reached.

The function keys 48, 50 and 52 in each case contain an LED (Light-Emitting Diode) which is used for signaling the call mode of the relevant function key 48, 50 and 52, respectively. Four call modes are signaled:

LED extinguished—the receiver at the terminal, the call number of which is allocated to the LED, is on hook, LED flickering—the telephone allocated to the LED is attempting to set up a call to the telephone at which the LED is located, LED flashing—the telephone allocated to the flashing LED is called by another telephone, the flashing LED being located at a telephone not called, and LED lit without interruption—the receiver of the telephone allocated to the LED is off hook and the subscriber is in call mode.

For the application program 22 to be able to produce its functions, the telephones 46, 54 and 56 and the interfaces at the telecommunication systems 12, 14 and 16 are associated with model identifiers according to the CSTA Standard ("Services for Computer Supported Telecommunication Applications Phase III). This standard was issued as third edition in December 1998 by the ECMA (European Computer Manufacturers' Association). Further editions of the standard have already been produced.

Thus, a model identifier D0 is allocated to the line unit 38. The telephone 46 has a model identifier D1. The model identifier D2 is allocated to an interface 58 of the telecommunication system 12 to the data transmission network 20.

A model identifier D3 is allocated to an interface 60 of the telecommunication system 14 to the data transmission network 90. A model identifier D8 is allocated to a further interface 62 of the telecommunication system 14 to the data transmission network 20.

The telecommunication system 14 also contains a control unit 64. A model identifier D4 is allocated to the telephone 54 connected to the telecommunication system 14. In addition, the telephone 54 has function keys 70, 72 and 74 to which the short code identifiers of telephones 46, 54 and 56 are allocated in this order, i.e. the short code identifiers "100", "200" and "300", respectively. The telephone 54 itself can be reached by direct dialing "200".

The telecommunication system 16 contains a control unit 80 and an interface 82 to the data transmission network 20. The model identifier D5 is allocated to the interface 82. A model identifier D6 was allocated to the telephone 56.

At the telephone 56, there is a multiplicity of function keys, of which three function keys 90, 92 and 94 are shown in FIG. 1, to which the short code identifiers of telephones 46, 54 and 56, respectively, are allocated in this order, i.e. the identifiers "100", "200" and "300", respectively. The telephone 56 itself can be reached by direct dialing "300".

Call data and signaling data between the telecommunication systems 12 to 16 are transmitted by the standardized QSIG protocol, see ECMA Standard No. 173/174. The voice data and the signaling data, however, are "tunneled", i.e. transmitted with the aid of data packets, via the data transmission network 20.

Figure 2B:
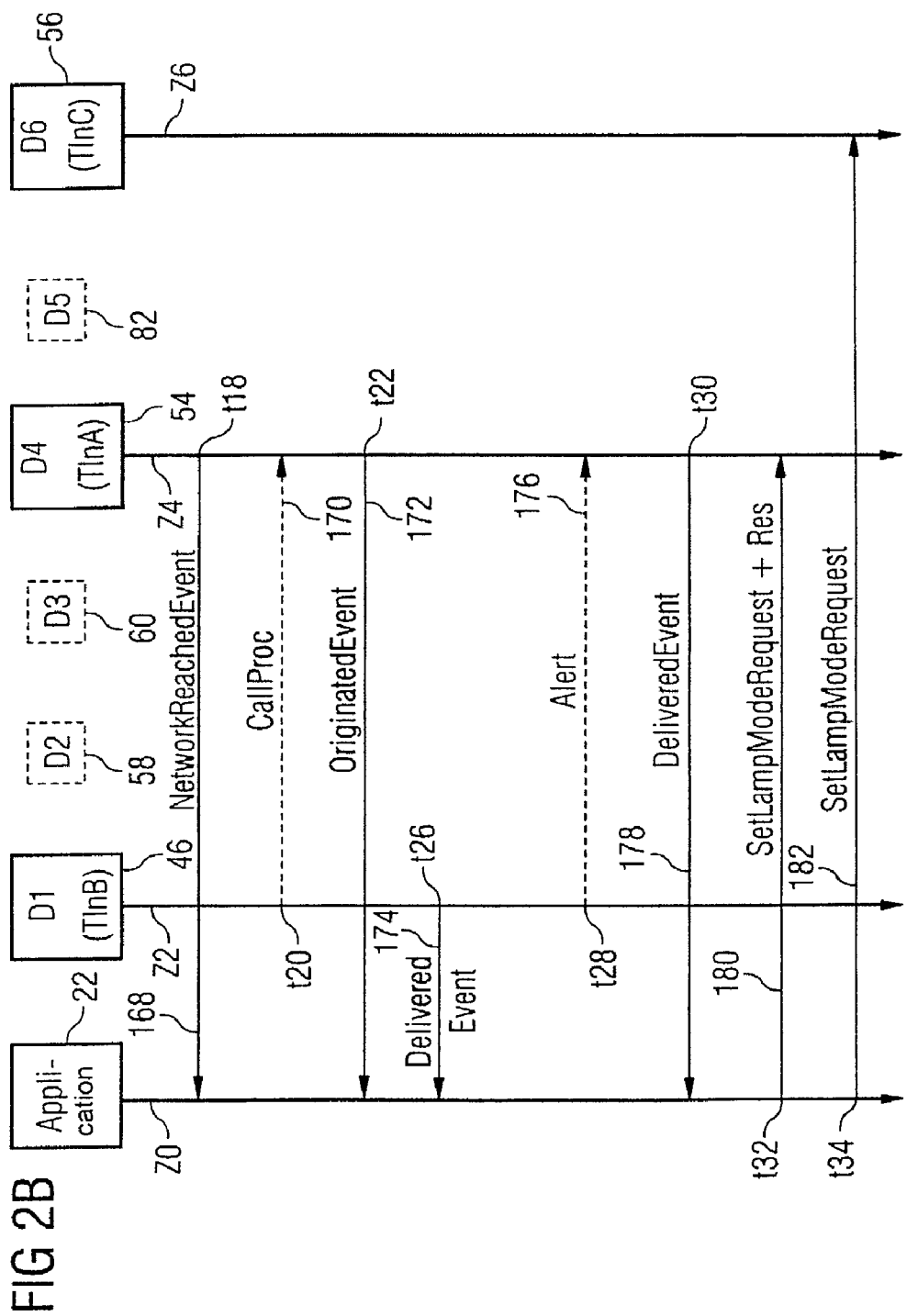

FIGS. 2A and 2B show messages which are generated during a call which is performed within the telecommunication system link-up 10. In general, it holds true for the messages explained in this description that only those information elements which are of significance for understanding the invention are explained. Information elements which are not essential for the invention are not taken into consideration. It shall be assumed that a subscriber TlnA wishes to call from telephone 54 a subscriber TlnB who normally uses telephone 46.

The signal flow will be explained with the aid of time lines Z0, Z2, Z4 and Z6 which, in this order, are allocated to events which are allocated to the telephone 46, the telephone 54 and the telephone 56, respectively, in the application program 22. Later times are further down than earlier times along the time lines Z0 to Z6. Equal times are at an equal level.

At a time t0, the subscriber TlnA takes the receiver of terminal 54 off hook and operates the function key 70 to which the short code destination "100" is allocated, in order to call the terminal 46 of the subscriber TlnB. Due to the operation of the function key 70, the call control 64 in the telecommunication system 14 generates a CSTA message 150 which, according to the standard, is called Button-PressEvent message and contains the following parameters:

| | |
|---|---|
| device | D4, |
| button | B1, and |
| privateData | 0, | the identifier D4 corresponding to the identifier explained above with reference to FIG. 1. An identifier B1 designates the function key 70. The CSTA message 150 is transmitted by the telecommunication system 14 via the data transmission network 20 to the application program 22 where it is evaluated.

At a time t2, the application program 22 generates a CSTA message which, according to the standard, is called Make-CallRequest and contains the following parameters:

| | |
|---|---|
| callingDevice | D4, and |
| calledDirectoryNumber | D1, | the identifiers D4 and D1 corresponding to the identifiers explained above with reference to FIG. 1. The CSTA message 152 is transmitted via the data transmission network 20 to the switching center 14 where it is processed by the call control 64.

At a time t4, the call control 64, due to the CSTA message 152, generates a CSTA message 154 which, according to the standard, is also called MakeCallResult and contains the following parameters:

| | |
|---|---|
| initiatedCalls | D4C2, |

C2 being a call identifier which will be explained in greater detail below with reference to FIG. 3.

The CSTA message 154 is transmitted by the switching center 14 via the data transmission network 20 to the application program 22 where it is evaluated.

Following this, the application program 22 generates at a time t6 a CSTA message 156 which, according to the standard, is also called SetLampModeRequest and contains the following parameters:

| | |
|---|---|
| device | D1, |
| lamp | L2, |
| lampMode | "flutter", | the identifier L2 designating the LED in the function key 50 of the telephone 46, i.e. the function key which is allocated to the telephone 46 itself. The identifier "flutter" designates an operating mode in which the LED of the function key 50 flickers in order to indicate that telephone 46 is being called. The CSTA message 156 is transmitted via the data transmission network 20 to the switching center 12, the call control 44 of which then initiates the flashing of the LED in the function key 50, for example with the aid of a so-called stimulus protocol.

At a time t8, the application program 22 generates a CSTA message 158 for the telephone 56. The CSTA message 158 is also called SetLampModeRequest and contains the following parameters:

| | |
|---|---|
| device | D6, |
| lamp | L8, |
| lampMode | "steady", |

L8 being an identifier of an LED in the function key 92 of the telephone 56. The identifier "steady" designates an operating mode of this LED in which the LED is lit uninterruptedly. The CSTA message 158 is also transmitted, however, via the data transmission network 20 back to the telecommunication system 16. In the telecommunication system 16, the call control 80 evaluates the CSTA message 158 and causes the LED to be driven in accordance with this CSTA message 158. The LED lit in the function key 92 at telephone 56 indicates to the subscriber TlnC that the subscriber TlnA has taken the receiver of his terminal off the hook.

In FIG. 2A, acknowledgement messages for the CSTA messages 156 and 158 are not shown. According to the standard, the acknowledgement messages are also called SetLampModeResult messages.

Moreover, FIG. 2A does not explain any messages by which the telecommunication system 14 drives LEDs which relate to telephones 54 which are connected directly to the telecommunication system 14. This is because the telephones 54 connected directly are driven as before. Thus, an LED in function key 72 is switched on in order to signal also to subscriber TlnA that he has taken the receiver off hook.

As a consequence of the CSTA message 152, the control unit 64 also generates at a time t12 a CSTA message 162 which, according to the standard, is also called ServiceInitiatedEvent message and contains the following parameters:

| | |
|---|---|
| initiatedConnection | D4C2, |
| initiatingDevice | D4, |
| localConnectionInfo | "Initiated", |
| cause | "make Call", |
| callLinkageData | G1, T1, | where G1 is a global identifier and T1 a so-called thread identifier. Global identifiers and thread identifiers are explained in greater detail in edition 2000 of the CSTA Standard in another connection. The CSTA message 162 is transmitted via the data transmission network to the application program 22. Due to the CSTA message 152, the control unit 80 of the telecommunication system 16 also generates at a time t14 a connection setup message 164 according to the signaling for a circuit-switched data transmission. This signaling is tunneled via the data transmission network 20 to the telecommunication system 12 in accordance with a tunneling protocol. The tunneling protocol is also used for transmitting voice data.

The control unit 44 of the telecommunication system 12 processes the connection setup message 164 according to protocol and, at a time t16, sends an acknowledgement message 166 which is also called SetupAck message, in order to acknowledge the connection setup message 164. The acknowledgement message 166 is also tunneled to the control unit 64 via the data transmission network 20.

Due to the acknowledgement message 166, the control unit 64 of the telecommunication system 14 generates at a time t18 a CSTA message 168 which, according to the standard, is also called NetworkReachedEvent message and contains the following parameters:

| | |
|---|---|
| outboundConnection | D3C2, |
| networkInterfaceUsed | D3, |
| callingDevice | D4, |
| calledDevice | D3, |
| localConnectionInfo | "connected", |
| cause | "normal", |
| callLinkageData | G1, T1, | where the identifiers have the meanings already explained. The CSTA message 168 informs the application program 22 of the arrival of the acknowledgement message 166. At a time t20, the control unit 44 of the telecommunication system 12 generates, due to the connection setup message 164 by which all dialing digits have been transmitted, a proceed message 170 which is also called CallProc message. The proceed message 170 is tunneled to the control unit 64 via the data transmission network 20.

During the processing of the proceed message 170, the control unit 64 generates at a time t22 a CSTA message 172 which, according to the standard, is also called an OriginatedEvent message and contains the following parameters:

| | |
|---|---|
| originatedConnection | D4C2, |
| callingDevice | D4, |
| calledDevice | D1, |
| localConnectionInfo | "Connected", |
| cause | "new Call", |
| associatedCalledDevice | D3, |
| callLinkageData | G1, T1 | where the identifiers again have the meanings already explained. The CSTA message 172 is transmitted via the data transmission network 20 to the application program 22 where it is evaluated in order to update the call models.

At a time t26, the control unit 44 of the telecommunication system 12 also generates, due to the connection setup message 164, a CSTA message 174 which, according to the standard, is also called a DeliveredEvent and which contains the following parameters:

| | |
|---|---|
| connection | D4C2, |
| alertingDevice | D1, |
| callingDevice | D4, |
| calledDevice | D1, |
| originatingNIDConnection | D2C1, |
| localConnectionInfo | "Alerting", |
| cause | "new Call", |
| associatedCallingDevice | D2, |
| callLinkageData | G1, T1, |
| privateData partnerLine | D3C2, | where the identifiers have the meanings already explained. The data field "privateData" is provided in the CSTA Standard and makes it possible to transmit proprietary data, in the exemplary embodiment the identifier D3C2 which identifies the other half call with respect to the telecommunication system 14. This half call can be diverted later to another telephone with the aid of a call transfer explained below.

The control unit 44 of the telecommunication system 12 causes a signal tone to be generated at the terminal 46 in order to call the subscriber TlnB. At the same time, the control unit 44 generates at a time t28 a call message 176 which is also called alert message and which signals that the subscriber TlnB is being called. It shall be assumed that the subscriber TlnB is not at his station and thus cannot accept the incoming call. The alert message 176 is transmitted via the data transmission network 20 to the control unit 64 where it is processed.

During the processing of the alert message 176, the control unit 64 generates at a time t30 a CSTA message 178 which, according to the standard, is also called a DeliveredEvent message and contains the following parameters:

| | |
|---|---|
| connection | D3C2, |
| alertingDevice | D1, |
| callingDevice | D4, |
| calledDevice | D1, |
| localConnectionInfo | "Connected", |
| cause | "new Call", |
| associatedCalledDevice | D3, |
| callLinkageData | G1, T1, |
| privateData partnerLine | D2C1, | where the identifiers have the meanings already explained. The half call identifier D2C1 designates a half call at the end of the switching center 12. The CSTA message 178 is transmitted via the data transmission network 20 to the application program 22.

At a time t32, the application program 22 generates, due to the CSTA messages 162, 168, 172, 174 and 178, a CSTA message 180 which, according to the standard, is also called a SetLampModeRequest and contains the following parameters:

| | |
|---|---|
| device | D4, |
| lamp | L4, |
| lampMode | "steady", | where L4 is the identifier for the LED in the function key 70 of the telephone 54. The CSTA message 180 is transmitted via the data transmission network to the control unit 64 where it is processed. The result of the CSTA message 180 is that the LED in function key 70 is switched on. As already mentioned, function key 70 is allocated to the called telephone 46 and, in the case of the calling telephone 54, indicates that the call has been successfully delivered.

At a time t34, the application program 22 generates a CSTA message 182 which, according to the standard, is also called SetLampModeRequest message and contains the following parameters:

| | |
|---|---|
| device | D6, |
| lamp | L7, |
| lampMode | "wink", | where L7 is an identifier of the LED in the function key 90 of the telephone 56. The CSTA message 182 is transmitted via the data transmission network 20 to the control unit 80 of the telecommunication system 16 where it is evaluated. Due to the CSTA message 182, the LED in the function key 90 is alternately switched on and off again, i.e. the LED flashes. The flashing indicates to the subscriber TlnC that the telephone 46 allocated to the function key 90 is being called. When a corresponding feature is activated, an additional signal tone is output at the telephone 56.

The CSTA message 180 and the CSTA message 182, in turn, are acknowledged by the telecommunication system 14 and by the telecommunication system 16, respectively, with the aid of an acknowledgement message which is also called SetLampModeResult message. However, the acknowledgement messages are not shown in FIG. 2.

Figure 3:
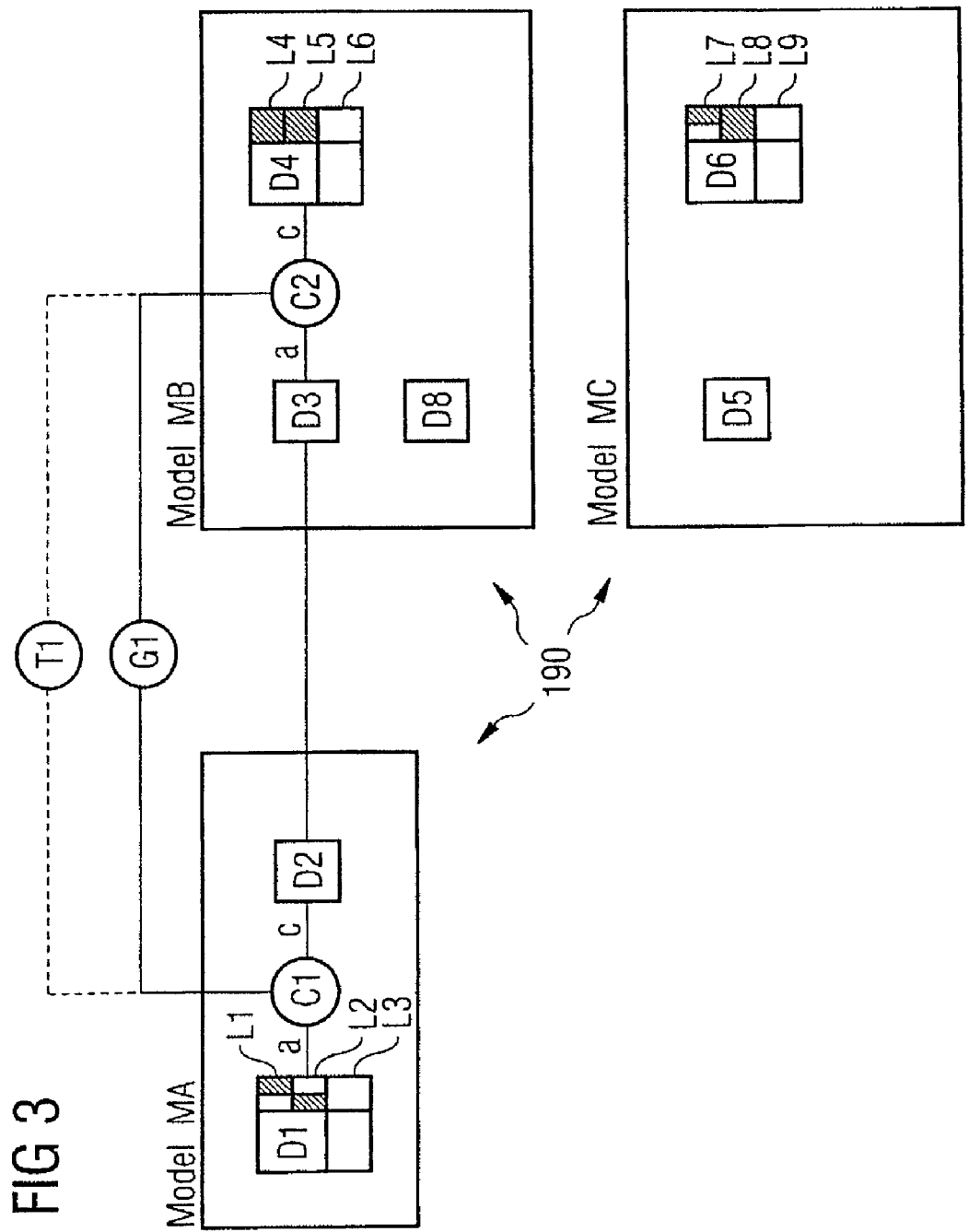
FIG. 3 is a functional block diagram of a call model of an application program at a time at which the telephone of the called subscriber is ringing.

FIG. 3 shows a call model 190 which is valid at time t36 in the application program 22. As can be seen from FIG. 3, the call model 190 is subdivided into three part-models MA, MB and MC which are allocated to telecommunication systems 12, 14 and 16, in this order.

With respect to part-model MA, it holds true that the identifier D1 and the identifier D2 are connected by the call identifier C1. On the side of the identifier D1, the call designated by the call identifier C1 has the connection mode "alerting", see lower-case letter a. At the time of the identifier D2, the call mode of the call designated by the call identifier C1 is identified by the lower-case letter c (connect). In the part-model MA, the modes of the LEDs in the function keys 48, 50 and 52 of telephone 46, which have been allocated identifiers L1, L2 and L3, respectively, are also shown. A square, the right-hand side of which is dark and the left-hand side of which is light, illustrates the flashing mode. A square, the left-hand side of which is dark and the right-hand side of which is light, illustrates the flickering mode.

In the part-model MB, the model identifiers D3 and D4 are connected via a call identifier C2. At the side of the model identifier D3, the call designated by the call identifier C2 has the call mode "alerting", see lower-case letter a. At the side of the model identifier D4, the call designated by the call identifier C2 has the call mode "connected", see lower-case letter c. In addition, the modes of LEDs 70, 72 and 74, to which identifiers L4, L5 and L6, respectively, have been allocated, are noted in the part-model MB. A square which is completely dark indicates the mode "switched on". The "switched on" mode is noted for the LEDs having the identifiers L4 and L5. For the identifier L6, the "switched off" mode is noted, see white square.

The call identifiers C1 and C2 are connected by the global identifier G1 to model a call which relates to a number of telecommunication systems, namely to the telecommunication system 12 and to the telecommunication system 14. The thread identifier T1 is also linked to the call identifiers C1 and C2 in order to identify the application process on the computer 18, with the aid of which the modeling is being carried out.

In the part-model MC relating to the telecommunication system 16, the model identifiers D5 and D6 are noted. In addition, the modes of the LEDs in function keys 90, 92 and 94, respectively, which have been allocated the identifiers L7, L8 and L9 in this order, are noted for the model identifier D6. For the identifier L7, the "flashing" mode is noted. For the identifier L8, the "switched on" mode is noted, see dark square. For the LEDs in function key 94, i.e. for identifier L9, the "switched off" mode is noted, see white square.

Figure 4A:
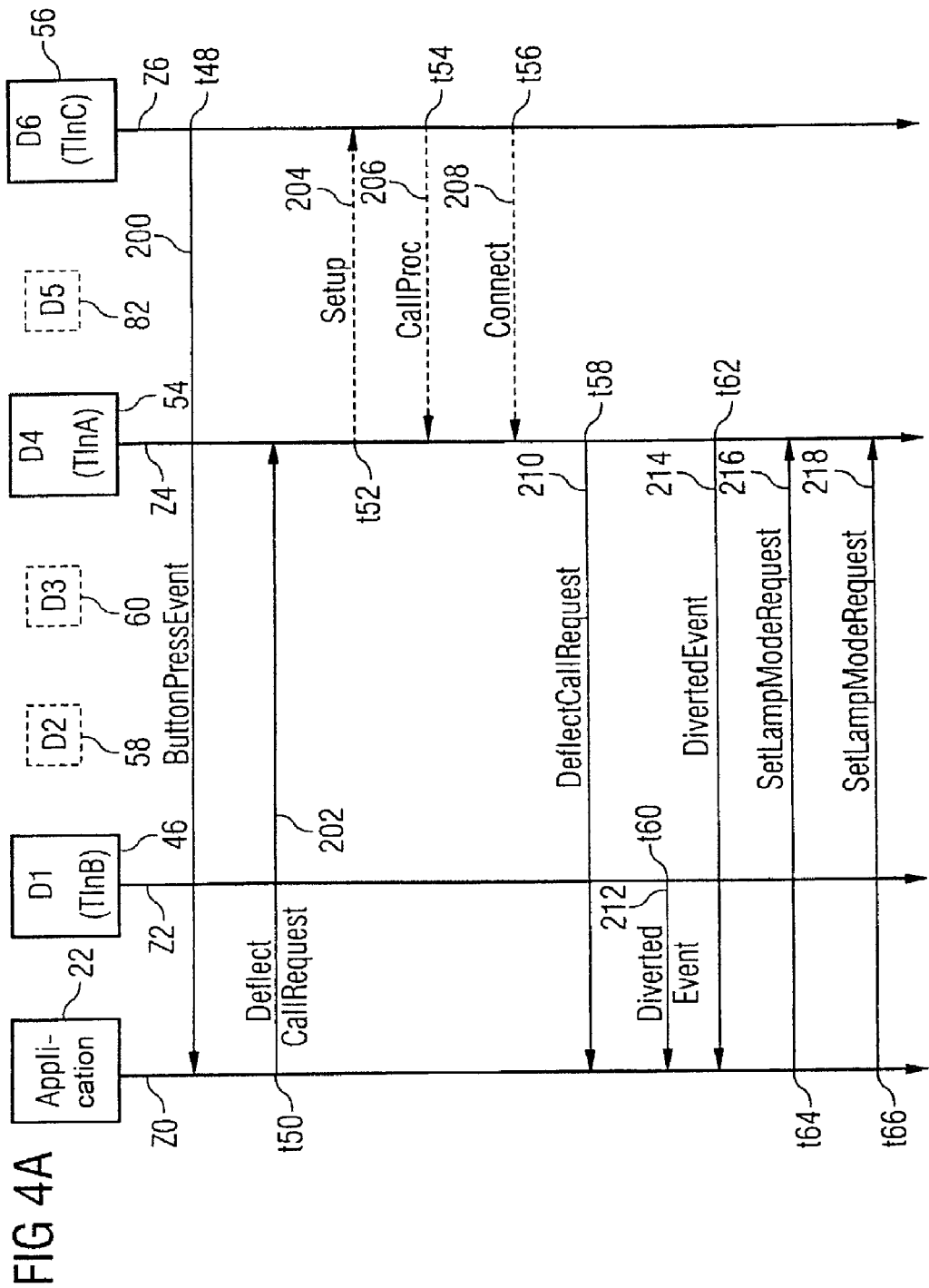

FIGS. 4A and 4B show messages which are generated within the telecommunication system link-up 10 when subscriber TlnC accepts the call directed by subscriber TlnA to subscriber TlnB. It shall be assumed that subscriber TlnC decides to accept the incoming call at telephone 46 by pressing the function key 90 on his telephone 56. By pressing function key 90, the control unit 80 of the telecommunication system 16 generates at a time t48 a CSTA message 200 which, according to the standard, is also called ButtonPressEvent message and contains the following parameters:

| | |
|---|---|
| device | D6, |
| button | B2, |
| privateData | 0, | where B2 designates an identifier which has been allocated to the function key 90. The CSTA message 200 is transmitted via the data transmission network 20 to the application program 22 where it is evaluated.

Due to the CSTA message 200, the application program 22, including the database 30, determines that the function key with identifier B2 is allocated to telephone 46. Due to the call model 190, the application program 22 detects that the half call D3C2 must be diverted, compare data field "partnerLine" in CSTA message 174. At a time t50, the application program 22 generates a CSTA message 202 which, according to the standard, is also called a DeflectCallRequest message and contains the following parameters:

| | |
|---|---|
| callToBeDiverted | D3C2, |
| newDestination | D6, | where the identifiers have the meaning already explained above. The CSTA message 202 is transmitted via the data transmission network 20 to the control unit 64 of the switching center 14 because the address LB has been noted for the calling telephone 54 (callingDevice) D4 by the TSP program 26.

The CSTA message 202 is acknowledged by the control unit 64 with the aid of an acknowledgement message, not shown, which, according to the standard, is also called a DeflectCallResult message.

Due to the CSTA message 202, the control unit 64 initiates at a time t52 the generation of a connection setup message 204 which is also called Setup message. The connection setup message 204 is tunneled from the telecommunication system 14 to the telecommunication system 16 via the data transmission network 20.

During the processing of the connection setup message 204, the control unit 80 of the telecommunication system 16 generates at a time t54 a proceed message 206 which is also called CallProc message. The proceed message 206 signals that all required dialing digits have been transmitted to the telecommunication system 16. The proceed message 206 is tunneled via the data transmission network 20 to the telecommunication system 14 where it is processed by the control unit 64.

Due to the connection setup message 204, the control unit 80 of the telecommunication system 16, after the establishment of a connection between the telephone 54 and the telephone 56, also generates at a time t56 a connection message 208 which is also called Connect message. The connect message 208 is tunneled from the telecommunication system 16 to the telecommunication system 14 via the data transmission network 20.

When the control unit 64 of the telecommunication system 14 processes the connect message 208, it generates at a time t58 a CSTA message 210 which, according to the standard, is also called DeflectCallResult message. The CSTA message 210 is transmitted to the application program 22 via the data transmission network 20.

At a time t60, the control unit 44 of the telecommunication system 12 generates a CSTA message 212 due to a connection clear-down message which is also called Disconnect message. The disconnect message comes from the switching center 14 but is not shown in FIG. 4A. According to the standard, the CSTA message 212 is also called DivertedEvent message and contains the following parameters:

| | |
|---|---|
| divertingConnection | D1C1, |
| divertingDevice | D1, |
| newDestination | D6, |
| lastRedirectionDevice | NR, |

-continued

| | |
|---|---|
| localConnectionInfo | zero, |
| cause | "redirected", |
| callLinkageData | G1, T1, | where the identifiers have the abovementioned meanings. The identifier NR designates a parameter which is not needed and, therefore, is not specified, either. The CSTA message 212 is transmitted via the data transmission network 20 to the application program 22 where it is used for updating the call model 190.

Due to the connect message 208, the control unit 64 of the telecommunication system 14 also generates at a time t62 a CSTA message 214 which, according to the standard, is also called DivertedEvent message and contains the following parameters:

| | |
|---|---|
| divertingConnection | D3C2, |
| divertingDevice | D1, |
| newDestination | D6, |
| lastRedirectionDevice | NR, |
| localConnectionInfo | "Connected", |
| cause | "redirected", |
| associatedCalledDevice | D8, |
| causeLinkageData | G1, T1, | where the identifiers have the abovementioned meaning. The CSTA message 214 is transmitted via the data transmission network 20 to the application program 22 where it is used for updating the call model 190.

At a time t64, the application program 22 generates a CSTA message 216 which, according to the standard, is also called SetLampModeRequest message and contains the following parameters:

| | |
|---|---|
| device | D4, |
| lamp | L4, |
| lampMode | "off", | where, in particular, the identifier L4 is allocated to the LED in the function key 70 of the telephone 54. The CSTA message 216 is transmitted via the data transmission network 20 to the switching center 14 where it is processed. Due to the CSTA message 216, the LED allocated to the telephone 46 on the telephone 54 is switched off.

At a time t66, the application program 22 generates a CSTA message 218 which, according to the standard, is also called SetLampModeRequest message and contains the following parameters:

| | |
|---|---|
| device | D4, |
| lamp | L6, |
| lampMode | "steady", | in order to switch on the LED in function key 74 and thus to signal to the subscriber TlnA that subscriber TlnC has taken the receiver of his telephone 56 off the hook in order to accept the call. The CSTA message 218 is transmitted via the data transmission network 20 to the telecommunication system 14 where it is processed.

At a time t70, the application program 22 generates a CSTA message 222 which, according to the standard, is also called SetLampModeRequest message and contains the following parameters:

| | |
|---|---|
| device | D6, |
| lamp | L1, |
| lampMode | "off", | in order to switch off the LED allocated to the telephone 46 in the function key 90. The CSTA message 222 is transmitted from a computer 18 to the telecommunication system 16 via the data transmission network.

At a time t72, the application program 22 generates a CSTA message 224 which, according to the standard, is also called SetLampModeRequest message and contains the following parameters:

| | |
|---|---|
| device | D1, |
| lamp | L3, |
| lampMode | "steady", | to switch on the LED allocated to the telephone 56 in the function key 52 at the telephone 46. The CSTA message 224 is transmitted via the data transmission network 20 to the switching center 12 where it is processed by the control unit 44.

The CSTA messages 216, 218, 222 and 224 are acknowledged by acknowledgement messages, not shown, which, according to the standard, are also called SetLampModeResult messages.

Due to the connect message 208, the telecommunication system 14 generates at a time t74 a feature message 226 which is also called facility message. The facility message contains an information element FIE (Feature Information Element) with an identifier callRerouting.rr, where rr identifies a return message (Returnresult). The facility message 226 is tunneled via the data transmission network 20 to the telecommunication system 16 where it is processed.

Due to the facility message 226, the control unit 80 of the telecommunication system 16 generates at a time t76 a CSTA message 228 which, according to the standard, is also called EstablishedEvent message and contains the following parameters:

| | |
|---|---|
| establishedConnection | D5C4, |
| answeringDevice | D6, |
| callingDevice | D4, |
| calledDevice | D1, |
| localConnectionInfo | "Connected", |
| cause | "newCalled", |
| associatedCalledDevice | D5, |
| callLinkageData | G1, T1, | where the identifiers have the abovementioned meaning. The CSTA message 228 is transmitted from the telecommunication system 16 to the application program 22 via the data transmission network 20.

At a time t78, the control unit 64 of the telecommunication system 14 also generates a CSTA message 230 which, according to the standard, is called EstablishedEvent message and contains the following parameters:

```
establishedConnection        D8C2,
answeringDevice              D6,
callingDevice                D4,
calledDevice                 D1,
originatingNIDConnection     D3C2,
localConnectionInfo          "Connected",
cause                        "new Call",
associatedCallingDevice      D8,
callLinkageData              G1, T1,
``` where the identifiers again have the abovementioned meanings. The CSTA message 230 is transmitted via the data transmission network 20 from the switching center 14 to the application program 22 where it is used for updating the call model 190.

Figure 5:
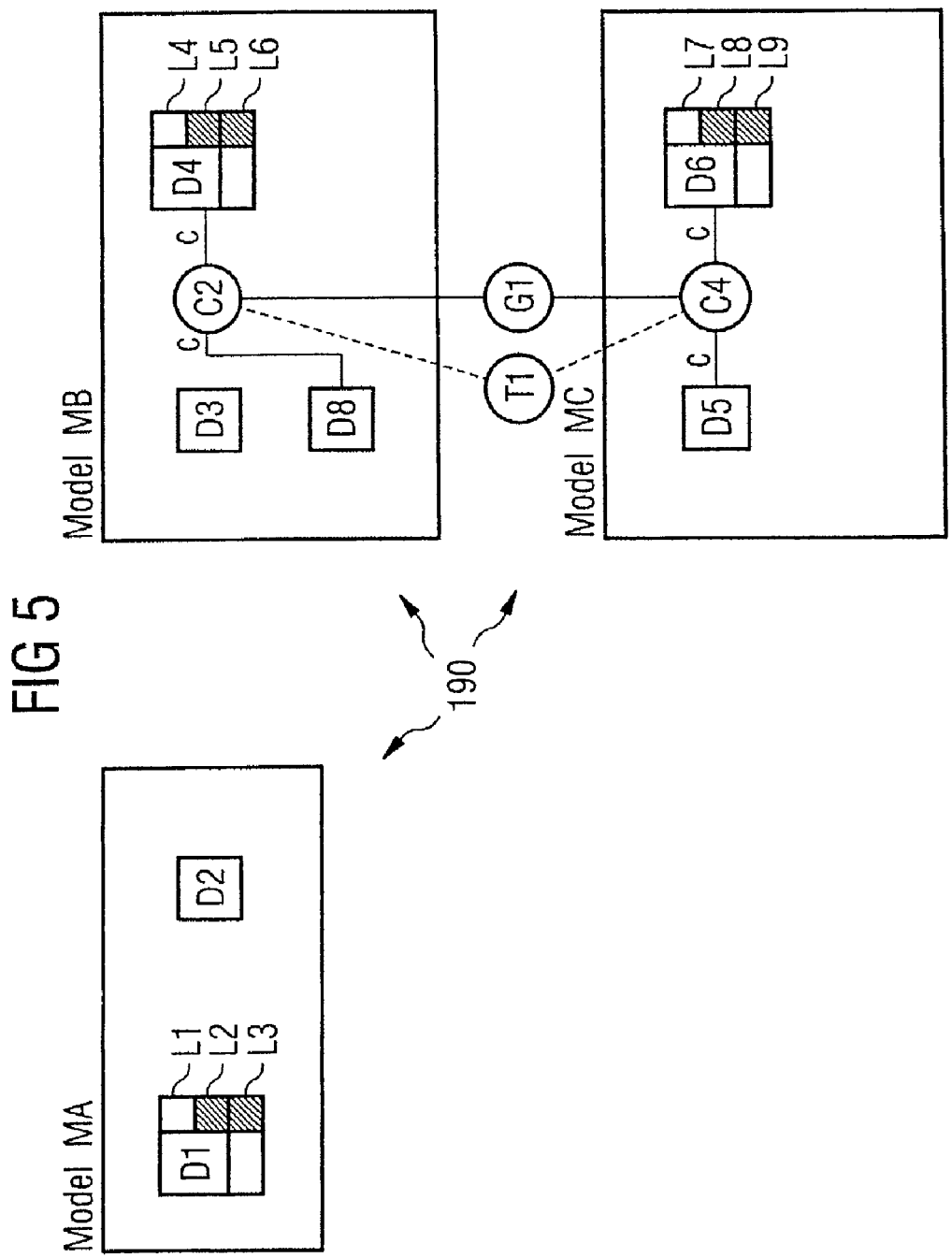
FIG. 5 is a functional block diagram of a call model of the application program after the call transfer.

FIG. 5 shows the call model 190 of the application program 22 after time t78. The model identifiers D1 and D2 are no longer linked by the call identifier C1. However, the operating modes "switched off", "switched on" and "switched on", respectively, are noted for the identifiers L1, L2 and L3 in this order.

In the part-model MB, the call identifier C2 now links model identifiers D4 and D8. Both part-calls of the calls designated by the call identifier C2 have the connection mode "Connected", see lower-case letter c (connect). For identifiers L4, L5 and L6, the operating modes "switched off", "switched on" and "switched on", respectively, are noted in this order.

In the part-model MC, a call identifier C4 links model identifiers D5 and D6. The half calls of the call designated by the call identifier C4 are in the connection mode "Connected", see lower-case letters c (connect). For the identifiers L7, L8 and L9, the operating modes "switched off", "switched on" and "switched on", respectively, are noted in this order. The global identifier G1 then links call identifiers C2 and C4 or, respectively, the calls designated by these call identifiers C2 and C4. The thread identifier T1 also links call identifiers C2 and C4.

FIG. 6 shows an information element 250 which, according to a second exemplary embodiment, is transmitted instead of the CSTA messages 216 and 218. The information element 250 contains eight data fields 252 to 266 which in each case have a length of eight bits 0 to 7. Data field 252 is used for transmitting an identifier for information element 250, e.g. for transmitting an element name. In the exemplary embodiment, the element is designated by the number 0xB0, where 0x indicates hexadecimal notation. In data field 254, the element length is specified since an information element 250 can have, for example, up to 20 element entries.

In the exemplary embodiment shown in FIG. 6, the information element 250 contains, apart from an element header 270 formed by data fields 252 and 254, two element entries 272 and 274. The data fields of an element entry always have the same meaning but their contents may differ from each other.

Element entry 272 replaces CSTA message 216. A first data field 256 of element entry 272 has the value four in order to point to identifier L4. A second data field 258 identifies the LED mode and, in the exemplary embodiment, has the value two in order to point to the "switched off" mode. A third data field 260 of element entry 272 specifies the device and, in the exemplary embodiment, has the value four in order to point to identifier D4.

In element entry 274, data fields 262, 264 and 266 have the value, in this order:
six to point to identifier L6,
three to identify the "switched on" mode, and
four to designate identifier D4.

Information element 250 is thus an extension of the CSTA standard. Naturally, other values can be used for designating information element 250 or for designating the various operating modes. The order of the data fields 252 to 266 can also be varied.

The TAPI interface 24 can be extended via a so-called "Extended Service" in such a manner that information element 250 can be processed. An example of such an extension is:

```
const WORD cwSetLEDBroadcast = 0x0045;
typedef struct
{
    BYTE        byButton
    BYTE        byLampMode
    DEVICE      Device;
}LedBroadcastElement;
struct SetLEDBroadcast_Struct : public Simple_Struct
{
    BB_Struct_Initialize(SetLEDBroadcast)
    LedBroadcastElement[20];
};
byLampMode
PHONELAMPMODE_FLUTTER
PHONELAMPMODE_OFF
PHONELAMPMODE_STEADY
PHONELAMPMODE_WINK
```

In another exemplary embodiment, no signaling modes to a terminal are indicated at this terminal itself. It is not possible to allocate to a short code key the call number of the terminal at which the key is located.

The invention has been described in detail with particular reference to preferred embodiments thereof and examples, but it will be understood that variations and modifications can be effected within the spirit and scope of the invention.

What is claimed is:

1. A method of driving indicating elements of first terminals connected to first switching facilities, respectively, the indicating elements indicating operating modes of monitored terminals, at least one terminal among the monitored terminals being connected to a second switching facility, comprising:

sending at least one operating mode message about an operating mode of the at least one terminal, from the second switching facility to the first switching facilities, via a network connecting the first and the second switching facilities; and driving indicating elements of at least one of the first terminals, allocated to indicate a status of the at least one terminal, by the first switching facilities, respectively, based on the received at least one operating mode message about the operating mode of the at least one terminal wherein one of operating modes of the at least one terminal is a call to the at least one terminal from a third terminal wherein said method further comprises picking up the call from the third terminal in response to operation of a function element arranged in close spatial relationship with an indicating element of the at least one of the first terminals, and wherein said picking up of the call includes diverting the call from the at least one terminal to the at least one of the first terminals.

2. The method as claimed in claim 1, wherein the at least one operating mode message signals the operating mode of the at least one terminal, by specifying a manner of driving the indicating elements of the at least one of the first terminals.

3. The method as claimed in claim 2, wherein the at least one operating mode message is a message according to a protocol based on a CSTA protocol.

4. The method as claimed in claim 2, wherein the at least one operating mode message includes a plurality of messages signaling a plurality of operating modes for a plurality of monitored terminals connected to the second switch.

5. The method as claimed in claim 4, wherein the first and second switching facilities are connected via a data transmission network.

6. The method as claimed in claim 5, further comprising:
signaling a central control unit, coupled to the data transmission network, when a function key at a third terminal is operated; and
generating the at least one operating mode message at the central control unit.

7. The method as claimed in claim 6, wherein said generating the at least one operating mode message is based on a call model.

8. A switching facility coupled to at least one terminal having indicating elements that indicate operating modes of monitored terminals, and to a network to which at least one other switching facilities coupled to monitored terminals, respectively, are connected, comprising:
at least one line unit connecting a first terminal to said switching facility, the first terminal having indicating elements to indicate an operating mode of monitored terminals connected to the at least one other switching facilities, respectively; and
a control unit coupled to said at least one line unit and the at least one other switching facilities, to receive operating mode messages indicating operating modes of the monitored terminals connected to the at least one other switching facilities, from the at least one other switching facility via the network, and to drive the indicating elements, according to the operating mode messages,
wherein said control unit receives at least one operating mode message indicating that a function key at a third terminal has been operated to initiate a call to at least one monitored terminal, and
wherein said control unit further picks up the call to the at least one monitored terminal, from the third terminal, in response to operation of a function element on the first terminal, the function element being arranged in close spatial relationship with the indicating element.

9. The switching facility as claimed in claim 8, wherein the switching facility is one of a telecommunication system and a personal computer performing functions of a telecommunication system.

10. A communication system, comprising:
first terminals, having indicating elements allocated to indicate statuses of monitored terminals;
at least switching facilities coupled to first terminals, and a network, each switching facility to send operating mode messages relative monitored terminals connected to the each switching facility, to other switching facilities via the network, the operating mode messages indicating a state of the monitored terminals connected to the each switching facility, each switching facility driving indicating elements at least one first terminal connected to the switching facility, based on the operating mode messages received from other switching facilities,
wherein the first terminals further includes a third terminal having a function key that can be operated to initiate a call to a monitored terminal,
wherein a switching facility to which the monitored terminal is connected sends an incoming call message to other switching facilities in response to detection of the call to the monitored terminal,
wherein any switching facility connected to a first terminal having an indicated element allocated to the monitored terminal, drives the indicating element based on the incoming call message to indicate initiation of the call to the monitored terminal, and
wherein the first terminal having the indicated element allocated to the monitored terminal includes a function element arranged in close spatial relationship with the corresponding indicating element allocated to the monitored terminal, and
wherein the switching facility to which the first terminal is connected picks up the call from the third terminal in response to operation of the function element of the first terminal.

11. The communication system as claimed in claim 10, wherein the switching facility picks up the call by connecting the first and third terminals and instructing a switching facility to which the monitored terminal is connected that the call is being diverted from the monitored terminal to the first terminal.

12. A computer readable medium storing a program for controlling a processor to perform a method for communication between terminals having at least one indicating element, said method comprising:
sending to first switching facilities coupled to first terminals having indicating elements, at least one operating mode message about an operating mode of a second terminal coupled to a second switching facility, the second switching facility being connected to the first switching facilities via a network, and the second terminal being allocated to respective first indicating elements of the first terminals; and
driving each first indicating element by a respective first switching facility, based on the received at least one operating mode message about the operating mode of the second terminal,
wherein one of the operating modes of the second terminal indicated by said driving of the first indicating element is a call to the second terminal from a third terminal,
wherein said method further comprises picking up the call from the third terminal in response to operation of a function element arranged in close spatial relationship with the first indicating element on a first terminal connected to one of the first switching facilities, and
wherein said picking up of the call includes diverting the call from the second terminal to the first terminal.

13. A method for communication between terminals connected to different switching facilities in a network, the terminals having indicating elements, comprising:
driving indicating elements of each terminal connected to the network via switching facilities, to signal operating modes of at least one other terminals connected to the network by other switching facilities, respectively, wherein the indicating elements of a terminal are allocated to indicate statuses of the at least one other terminals, and are driven by a switching facility connecting the terminal to the network based on messages received from the other switching facilities to which the at least one other terminals are connected, wherein one of the operating modes of the at least one other terminals is a call to the at least one other terminals from another terminal, wherein said method further comprises picking up the call from the another terminal in response to operation of a function element arranged in close spatial relationship with an indicating element on the terminal connected to the switching facility, and wherein said picking up of the call includes diverting the call from the at least one other terminal to the terminal.

14. The method as claimed in claim 1, wherein an indicating element of one of the at least one of the first terminals is driven to indicate when one of the at least one of the first terminal attempts to connect to the at least one terminal.

* * * * *